United States Patent

Thyberg et al.

[19]

[11] Patent Number: 6,139,272
[45] Date of Patent: Oct. 31, 2000

[54] HYDRAULIC MACHINE

[75] Inventors: Conny Thyberg; Thomas Nilsson, both of Kristinehamn, Sweden

[73] Assignee: Kvaerner Turbin Aktiebolag, Kristinehamn, Sweden

[21] Appl. No.: 09/171,488

[22] PCT Filed: Apr. 25, 1997

[86] PCT No.: PCT/SE97/00698

§ 371 Date: Oct. 20, 1998

§ 102(e) Date: Oct. 20, 1998

[87] PCT Pub. No.: WO97/41347

PCT Pub. Date: Nov. 6, 1997

[30]   Foreign Application Priority Data

Apr. 29, 1996 [SE] Sweden .................................. 9601629

[51] Int. Cl.[7] ............................ A47C 21/04; B63M 1/00
[52] U.S. Cl. ........................................ 416/146 A; 440/50
[58] Field of Search ........................... 416/146 A, 157 R, 416/174; 415/110, 111, 112, 175; 440/50

[56]   References Cited

U.S. PATENT DOCUMENTS

| | | | |
|---|---|---|---|
| 2,477,954 | 8/1949 | Blanc ......................................... | 415/33 |
| 2,486,643 | 11/1949 | Graham ................................ | 416/174 X |
| 2,988,154 | 6/1961 | Hub ...................................... | 416/174 X |
| 3,912,418 | 10/1975 | Andrews et al. ........................ | 416/174 |
| 4,046,486 | 9/1977 | Kolb ..................................... | 416/157 R |
| 4,308,464 | 12/1981 | Yamamoto .......................... | 415/175 X |
| 4,545,734 | 10/1985 | Schilder .............................. | 416/146 A |
| 4,668,168 | 5/1987 | Schilder et al. ..................... | 416/157 R |
| 4,693,672 | 9/1987 | Carvalho ................................. | 416/174 |
| 5,122,034 | 6/1992 | Isert ....................................... | 416/167 |
| 5,513,964 | 5/1996 | Rockwood .......................... | 415/175 X |
| 5,588,798 | 12/1996 | Fork .................................... | 415/175 X |
| 6,042,337 | 3/2000 | Thyberg .............................. | 416/146 A |

FOREIGN PATENT DOCUMENTS 1124170  8/1968  United Kingdom .

OTHER PUBLICATIONS

Derwent's Abstract, No. 93–150466/18, Week 9318, Abstract of SU, 1733676, Lengd Turbine Association, May 15, 1992.

Patent Abstracts of Japan, vol. 9, No. 98, M–375, Abstract of JP A 59–221473, Fuji Denki Seizo K.K., Dec. 13, 1984.

*Primary Examiner*—John E. Ryznic
*Attorney, Agent, or Firm*—Birch, Stewart, Kolasch & Birch, LLP

[57]   ABSTRACT

A device is used in a hydraulic machine of the type which comprises a runner or rotor with a hub body and vanes or blades which are rotatably journalled in bearings in the hub body, and which has at least one chamber which communicates with the bearings. The device comprises an oil supply to the bearings and elements for leading oil away from the chamber at pace with the supply of oil, such that the chamber is caused to contain an essentially constant volume of oil, which is smaller than the total volume of the chamber, which oil volume is pressed towards the peripheral wall of the chamber by the centrifugal force at the rotation of the runner.

12 Claims, 3 Drawing Sheets

HYDRAULIC MACHINE

TECHNICAL FIELD

The invention relates to a device in a type of hydraulic machine which comprises a runner or rotor with a hub body and vanes or blades which are rotatably journalled in bearings in the hub body, which has at least one chamber which communicates with said bearings.

The invention has been developed as an improvement of the Kaplan turbine but can be applied also for other hydraulic machines of the kind mentioned in the preamble, such as ship propellers with angularly adjustable blades.

PRIOR ART

Conventionally the hub chamber in Kaplan turbines is filled with oil. The primary purpose of the oil is to lubricate the runner blade bearings. Other important functions are the provision of an adequate corrosion protection in the hub and the provision of a possibility to detect entrance of water into the hub. In order to prevent water from entering the hub, a risk which can not be completely disregarded as far as the hub designs of today are concerned, the entire hub body is filled with pressurized oil. This, however, leads to a risk that oil will leak out. As a matter of fact, the leakage of oil from Kaplan turbines occurs so frequently that it is considered as a significant environmental problem, since the oil that leaks out will contaminate the river in which the turbine is operating. Moreover, accidents can occur, when the hub is completely emptied of oil, which can cause major damages to the river. Yet pressurising the oil in the hub body is not a guarantee against water entering the hub. Many systems have been developed for the prevention of such water entrance as well as systems for the detection of the existence of water in the hub.

BRIEF DISCLOSURE OF THE INVENTION

The invention aims at attacking the above problems and to offer an improved system which provides adequate lubrication of those bearings and other parts in the hub which need to be lubricated with oil and at the same time minimizes the risk for oil leakage and also, in case of brake down, essentially reduces damages to the environment because of oil that may leak out.

Another objective is be able to implement and employ the invention in existing machines while only small completions or changes are made in the machine design.

Further scope of applicability of the present invention will become apparent from the detailed description given hereinafter. However, it should be while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

In the following description of a preferred embodiment, reference will be made to the accompanying drawings which are given by way of illustration only, and thus are not limitive of the present invention, and in which.

Figure 1:
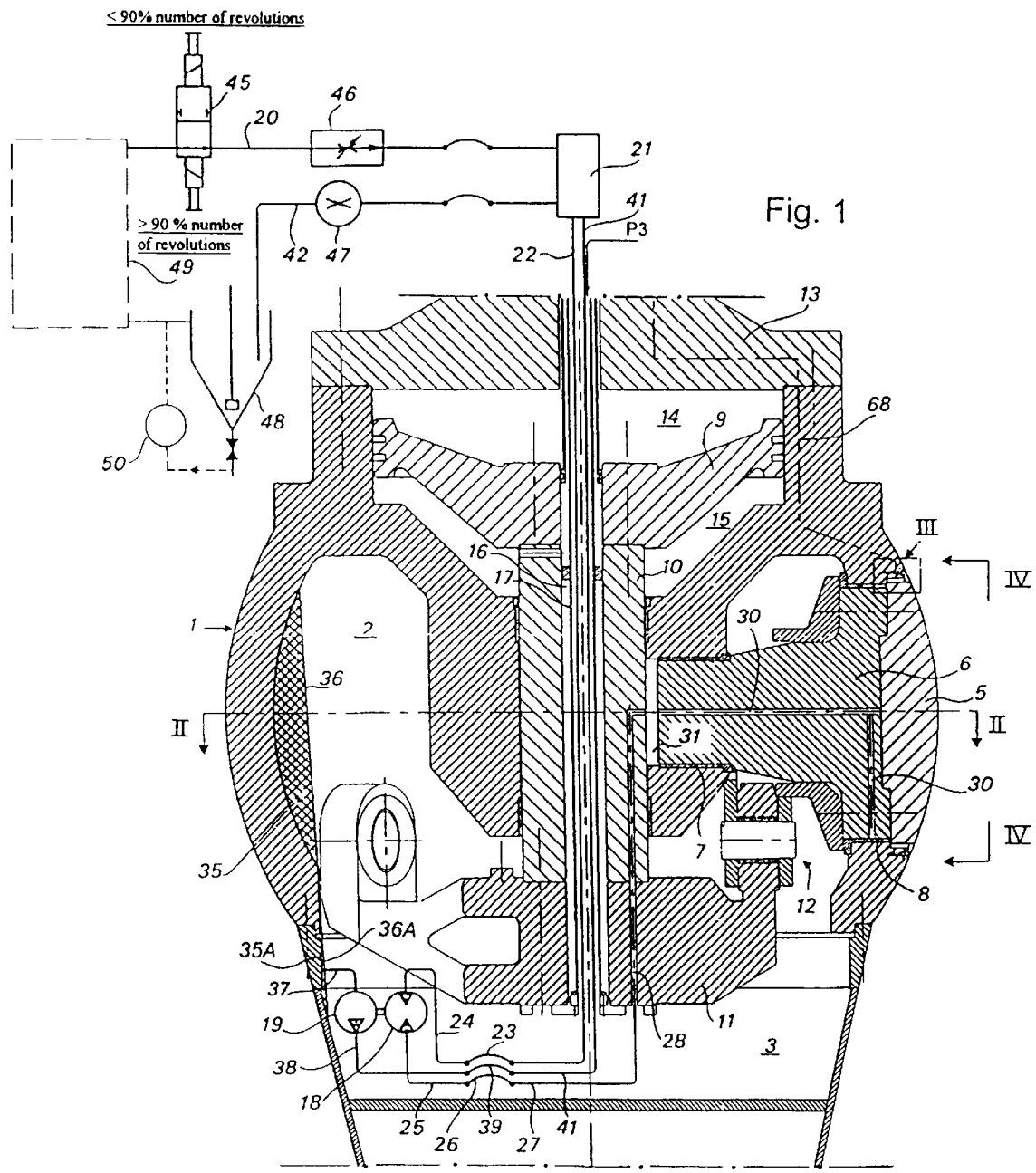
FIG. 1 is an axial section through a runner of a Kaplan turbine having a design which is known per se, in which the invention is employed and wherein the characterizing parts of the invention are schematically illustrated.

In the drawings, only such details have been shown which are required for the understanding of the principles of the inventions, while other details have been omitted, such as the runner blades in FIG. 1, in order that the essential shall be more clear.

DETAILED DESCRIPTION OF THE INVENTION

Figure 4:
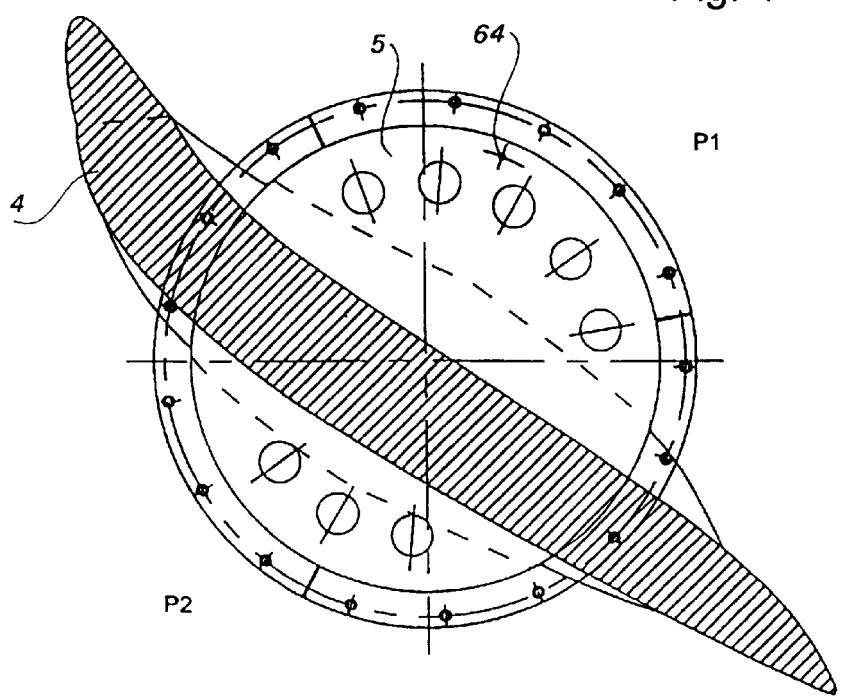
FIG. 4 is a view along the line IV—IV in FIG. 1.

In FIG. 1 a hub body, secured to a turbine shaft flange 13, is generally designated 1. The interior of the hub in this text is referred to as hub body chamber, generally designated 2, which also includes a bottom part 3 in the region of the nose portion of the turbine, in this text referred to as dry-sump. The turbine is provided with a number of runner blades 4, FIG. 4, each one having a blade flange 5, which via screw couplings is fastened to a blade trunnion 6. The blade trunnion is journalled in inner and outer sliding bearings 7, 8, respectively, in the hub body 1. The trunnions 6, and hence the blades 4, are angularly adjustable by rotation in the bearings 7 and 8 in a manner known per se by means of motion means which comprise a servo-motor piston 9, a piston rod 10, which is vertically moveable in the hub body 1, a cross head 11 and a lever mechanism generally designated 12. Hydraulic chambers 14 and 15 are provided for the movements of piston 9. An axial bore 16 with a pipe 17 extends through piston 9, piston rod 10, and cross head 11.

The elements which have been described so far belong to prior art and shall not be described more in detail in this text and nor shall the piston 9, which is manoeuvred by means of hydraulic fluids in the hydraulic chambers 14 and 15.

According to the invention the hub chamber 2 is connected to ambient atmospheric pressure P3 via the pipe 17 in the boring 16. Further, according to the invention, a displacement type of hydraulic motor 18 and a displacement type of hydraulic pump 19 is driven by the hydraulic motor, which is accommodated in the dry-sump 3. The hydraulic motor 18 is driven by a pressure source, not shown, included in a unit 49 via a first conduit 20, a swivel 21 and a second conduit 22 which extends down through the pipe 17 to the dry-sump 3, a hose portion 23 and a connection conduit 24. A conduit 25, a hose portion 26 and a conduit 27 extend from the hydraulic motor 18 to a conduit 28 in the cross head 11 and in the piston rod 10. The conduit 28 leads to the closed, circumferential space 31 at the exterior of the piston rod 10 between the blade trunnions 6 and the piston rod 10. A conduit 30 proceeds through each blade trunnion 6 from the space 31 to the outer bearing 8.

Figure 2:
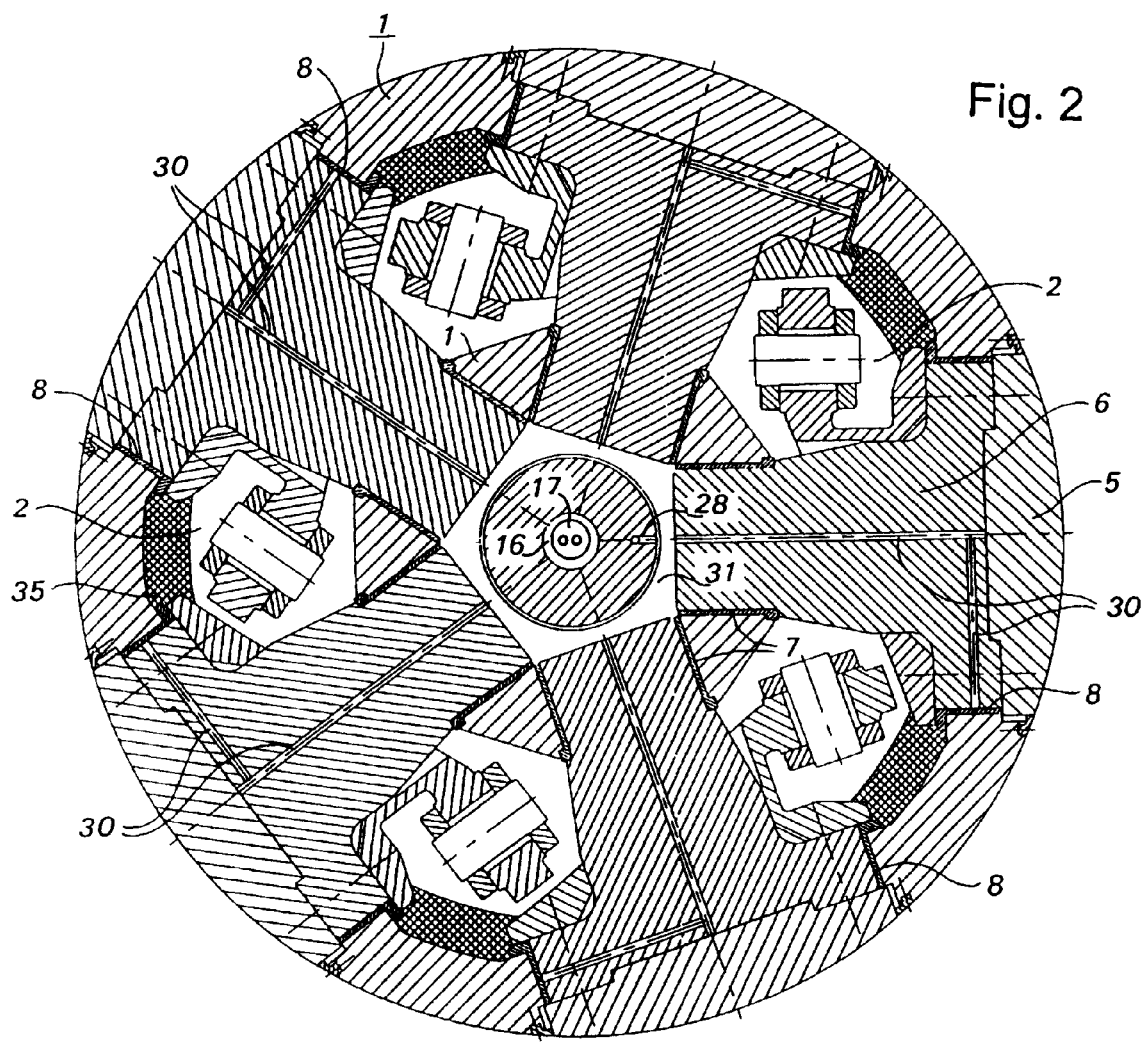
FIG. 2 is a cross section through the runner in a view along the line II—II in FIG. 1.

The chamber 2 contains a quantity of oil 35, which is not greater than that, at the rotation of the runner, it will be pressed towards the wall of the hub body 1 and substantially fill the volume which in the axial section has the shape of a bowl, FIG. 1, between the blade trunnions 6, FIG. 2. Under the influence of gravitation, when the turbine shaft is vertical, the inner surface 36 of the oil volume 35 will not be completely vertical but slightly inclined downwards-inwards, FIG. 1, such that a small volume 35A with an inner surface 36A will also extend down into the dry-sump 3. In the latter region there is a suction conduit 37 which leads to the hydraulic pump 19 from the volume 35A. A conduit 38 leads from the pump 19, a portion 39 of hose and a return conduit 41 lead to the swivel 21 and from there a return conduit 42 leads to an oil trough (not shown) or corresponding unit 49.

A magnet valve 45 in the feeder conduit 20 is provided not to open until the turbine runner rotates at almost nominal rotation speed (at least 90% of nominal rotation speed), and in the conduit 20 there is also a constant flow valve 46. A flow control 47 and a tank 48 for detecting and/or separating and leading away water with contaminated oil are also provided in the return conduit 42. Further, a separator 50 can be provided for taking care of any water that may have been contaminated with oil. The purified oil can be recirculated to the tank 48 from the separator 50. The unit 49 contains i.a. a pressure source and oil trough etc.

The described system operates in the following way. Upon start up, the turbine is filled with a certain quantity of oil in chamber 2, e.g. through the pipe 17. During normal operation oil is fed from the pressure source (not shown) in the unit 49 through the conduit 20, the swivel 21 and the conduits 22, 23, and 24 to the hydraulic motor 18, which drives the pump 19. From the hydraulic motor 18 oil is led through the conduits 25, 26, and 27 to the conduit 28 and through an opening in the piston rod 10 into the space 31. The oil lubricates and passes through the inner trunnion bearings 7 whereafter the oil splashes around in the hub body chamber 2, wherein it will lubricate the various part of the hub before the oil reaches and lubricates the outer trunnion bearings. The bearings in the lever mechanism 12, however, are suitably the self-lubricating type. Further, oil is led from the space 31 through the channels 30 to the outer bearings 8 in order to ensure that also those bearings are lubricated. Through the rotation of the runner, oil is pressed from the bearings 7 and 8 further on towards the rounded wall of the valve body 1 to fill the said bowl-shaped space. This oil volume 35 corresponds to only a minor portion of the total volume of chamber 2, e.g. less than 10%. The oil volume 35 is kept constant therein that the pump 19, via the suction conduit 37, sucks oil from that oil volume fraction 35A which extends down into the dry-sump 3 and further via the conduits 38, 39, 40, 41, the swivel 21, and the return conduit 42. The displacement of pump 19 is greater than that of motor 18, which ensures that the oil level 36A and the oil volume 35 are maintained constant. The flow of oil is kept constant by means of the constant flow valve 46 and is watched by the flow control 47, so that disturbances in the function are indicated and can be attended to. Possibly, water existing in the oil is detected in the tank 48 and can, if necessary, be removed in the separator 50 before the oil is recirculated to the tank 48 or directly to the unit 49. If water would enter the system, measurements can be made at any suitable, pre-planned time in order to prevent continued entrance, e.g. by exchange of sealing rings. It shall in this connection also be mentioned that the water detection is facilitated at the system of the invention by the fact that the lubricating oil is continuously circulating in a cyclical path within the system and by the fact that the total amount of lubricating oil in the system is comparatively small. Further should be mentioned that hydraulic oil which could possibly leak into the hub body chamber 2 from either of the hydraulic chambers 14 or 15 will be taking care of in the system and added to the circulating oil.

Through the rotation of the runner, which e.g. can develop a centrifugal force of 20 g of the oil volume 35, the oil is pressed with a certain force towards the outer blade trunnion bearings 8 but otherwise the oil in chamber 2 is not subjected to any overpressure. The pressure acting on the oil volume 35 therefore normally is lower than the ambient water pressure, which strongly reduces the risk that oil will leak out to the surrounding water.

Figure 3:
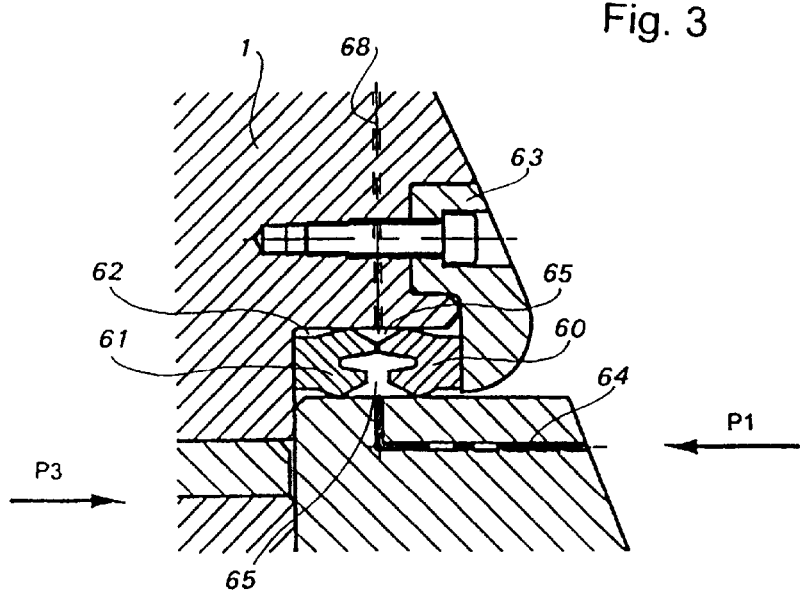
FIG. 3 shows the framed detail III in FIG. 1 at a larger scale, illustrating the system for preventing entrance of water into the hub.

Although the risk that oil would leak out to ambient water is very small, as the oil in the hub body chamber is not subjected to any overpressure, this risk can be further minimized by a good seal between the outer blade trunnion bearings 8 and surrounding water. In FIG. 3 such a sealing system is shown, which comprises an outer and an inner sealing ring 60 and 61, respectively made of rubber or other elastomer, accomodated in an angular gap 62 which surrounds the blade flange 5. The sealing rings 60, 61 are secured in the gap 62 by means of a clamping ring 63 which is fastened by screws in the hub body 1. The greatest risk for oil to leak out, although the valve hub body chamber 2 is not pressurized, exists at the suction side of the turbine, i.e. on the "under-side" or the "rear-side" of the runner blades where the pressure is very low. This pressure, pressure P2, is lower than the atmospheric pressure during operation, pressure P3, FIG. 3, which is the pressure at the inside of the hub. On the other hand, the pressure P1 on the pressure side of the runner blades, i.e. over the runner blades 4, is always higher than the atmospheric pressure. These conditions are utilized in the sealing arrangement of the invention. From the outside of the blade flange 5 in the region of the pressure side of the runner blades, i.e. from a point on the blade flange 5 above the blade 4, extends a channel 64 into a circumferential space 65 in the gap 62 between the outer and the inner sealing ring 60 and 61, respectively. The annular, circumferential space 65 between the sealing rings in other words will communicate with the ambient water at the pressure side of the turbine through the channel 64, which means that the space 65 will have the same pressure P1 around the entire circumference of the blade flange 5 as the water has on the pressure side. This in turn means that the pressure outside the inner sealing ring 61 is higher than at the inner side of the sealing ring 61 along the entire circumference thereof, i.e. within the region of the suction side of the blade flange where the water pressure P2 on the outer side is sub-atmospheric. The pressurizing of the circumferential space 65 therefore functions as a lock against oil leakage.

Moreover, or as an alternative, the space 65 can be pressurized by means of water from some other pressure source than the ambient water, preferably pressurized by means of pure water from the axle box (not shown) of the turbine shaft via a channel 68 which extends through the turbine shaft, the turbine shaft flange 13 and the hub body 1 to the space 65. This solution can be particularly advantageous when the fall of the power station and hence the pressure P1 is comparatively small.

Basically, the invention deals with the prevention of oil leakage to ambient water. This according to the invention is achieved therein that the invention is characerized by at least a number of the features which are mentioned in the appending patent claims or by all of these features in combination with each other. Among these features, it should be mentioned that the total amount of oil in the lubricating system is small, substantially smaller than the total volume of the hub body chamber; that the hub body chamber is at atmospheric pressure; that the lubricating oil is circulating in a loop; that means are provided for controlling the flow of oil so that possible oil leakage is detected and can be attended to; and that efficient sealing means are provided which favourize the entrance of water prior to allowing leakage of oil. At the same time it is a requirement that the lubrication shall be efficient and not be impaired by entering water. In this connection, the condition that water has a higher density than oil must be considered, which could create a tendency for water to separate from oil and for water to collect in the outer bearings 8 because of the centrifugal force. In order to prevent that tendency, it might be substantial to lead oil from the space 31 through the conduits 30 to the bearings 8. This function can be further guaranteed by the provision of means, e.g. constrictions of various kinds, e.g. efficient sealing of the inner bearings 7, in order to safely guide a flow of oil to the outer bearings 8. In the bearings 8, it can be permitted that the entering oil is mixed with possibly entering water, which is mixed together with the oil in the volume 35 and eventually led away through the return conduit 42, detected and discharged.

It should be realised that the invention is not restricted to runners having the design which has been explained in the foregoing description and not even to Kaplan turbine runners in general. For example, the invention may very well also be employed for the type of hydraulic machines mentioned in the preamble, which have a horizontal axis of rotation. Also in such machines, the comparatively small quantity of oil in the runner will be pressed out towards the periphery by the centrifugal force. It is true that the generated shape of the oil volume in that case will be different than that of machines having vertical shafts, more specifically it will obtain a cylindrical inner surface, but this fact can be considered at the location of the suction conduit 37 in the hydraulic pump 19.

It should also be mentioned that the pump 19 also in connection with the illustrated embodiment is located in consideration of the g-forces which also act in the suction conduit 37 of the pump, so that the pump will be capable of taking in oil through the suction conduit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device in a hydraulic machine having a runner or rotor with a hub body and vanes or blades which are rotatably journalled in bearings in the hub body, which has at least one chamber which communicates with the bearings, the device comprising:

first means for supplying oil to the bearings;

means for leading away oil from the chamber at a pace with the supply of oil, such that the chamber is caused to contain an essentially constant volume of oil, which is smaller than the total volume of the chamber, which oil volume is pressed towards a peripheral wall of the chamber by centrifugal force from rotation of the runner or rotor; and a pump for pumping oil away from the oil volume at the same pace as oil is supplied to the same oil volume via the first means.

2. The device according to claim 1, wherein the first means is provided to supply oil to regions between a rotation shaft of the runner or rotor and said bearings.

3. The device according to claim 1, wherein the pressure in a part of the chamber which is not filled with oil is lower than the pressure outside said bearings.

4. The device according to claim 1, wherein the first means is provided to drive a hydraulic motor, which drives the pump, and oil that is supplied to the bearings includes return oil from the hydraulic motor.

5. The device according to claim 4, wherein the pump is an hydraulic pump and wherein the oil that is supplied to the bearings consists of the return oil from the hydraulic motor.

6. The device according to claim 4, wherein the pump and the hydraulic motor are a displacement type and wherein the pump has a larger displacement than the motor.

7. The device according to claim 1, wherein the first means is provided to supply oil to the bearings via a closed space inside runner blade trunnions on which the blade is mounted.

8. The device according to claim 1, wherein the bearings include outer bearings and wherein the device further comprises at least one channel which leads oil to the outer bearings.

9. The device according to claim 1, further comprising sealing means between the bearings and ambient water, the sealing means include a circumferential first sealing member and a second circumferential sealing member at an inside of the first sealing member, a circumferential space being provided between the first and second sealing members, and the circumferential space being connected via a channel with water that has a pressure which is higher than the oil pressure in the bearings, so that the circumferential space is filled with water at the higher pressure.

10. The device according to claim 9, wherein the channel extends between the circumferential space and surrounding water at the pressure side of turbine runner blades, so that the circumferential space obtains a same pressure as water on pressure side of the runner blades.

11. The device according to claim 9, further comprising a channel extending from a pressure source in the turbine construction via a shaft of the turbine and the hub body to the circumferential space.

12. The device according to claim 11, wherein the pressure source in the turbine construction is from an axle box of the turbine shaft.

* * * * *